United States Patent [19]

Kaneyuki

[11] Patent Number: 4,518,886

[45] Date of Patent: May 21, 1985

[54] CHARGING GENERATOR HAVING WATERPROOF COVER

[75] Inventor: Kazutoshi Kaneyuki, Himeji, Japan

[73] Assignee: Mitsubishi Denki Kabushiki Kaisha, Tokyo, Japan

[21] Appl. No.: 460,047

[22] Filed: Jan. 21, 1983

[30] Foreign Application Priority Data

Jan. 27, 1982 [JP] Japan .................. 57-10455[U]

[51] Int. Cl.³ ............................................ H02K 5/10
[52] U.S. Cl. ...................................... 310/71; 310/87; 310/88; 310/89
[58] Field of Search ................... 310/71, 87, 88, 89; 339/185, 47, 49, 144, 145, 153, 154, 156

[56] References Cited

U.S. PATENT DOCUMENTS

| | | | |
|---|---|---|---|
| 2,311,805 | 2/1943 | Yost | 310/71 |
| 2,922,054 | 1/1960 | Miller | 310/71 |
| 3,308,316 | 3/1967 | Pfahl | 310/87 |
| 4,387,313 | 6/1983 | Yamamoto et al. | 310/71 |

FOREIGN PATENT DOCUMENTS 174954 12/1981 Japan .

Primary Examiner—Peter S. Wong
Assistant Examiner—D. L. Rebsch
Attorney, Agent, or Firm—Wenderoth, Lind & Ponack

[57] ABSTRACT

A charging generator for a motor vehicle comprises two connector housings disposed in diametrically opposite relationship on a bracket of the charging generator, including a single male terminal and a pair of male terminals respectively, a cup-shaped waterproof cover fixed to the bracket to cover a substantial portion, two connector housings disposed on the water-proof cover so as to be fitted into those on the bracket and including a single fitted terminal, and two fitting terminals respectively, the terminals being fitted onto associated male terminals on the bracket.

4 Claims, 4 Drawing Figures

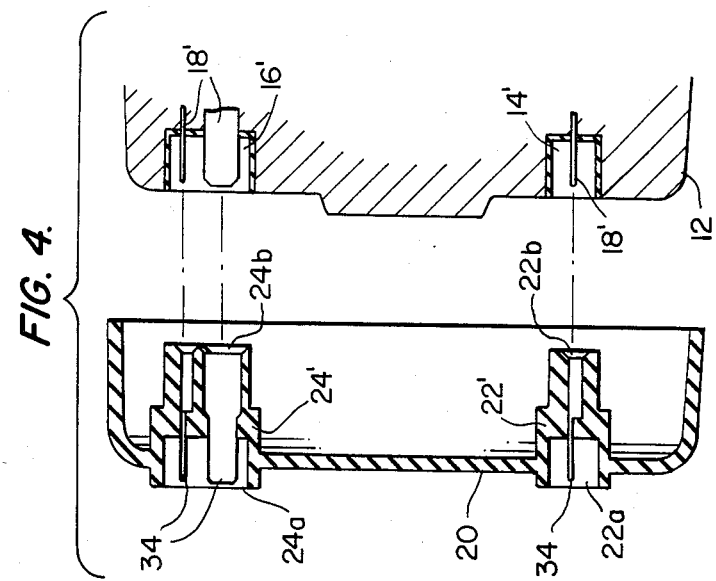
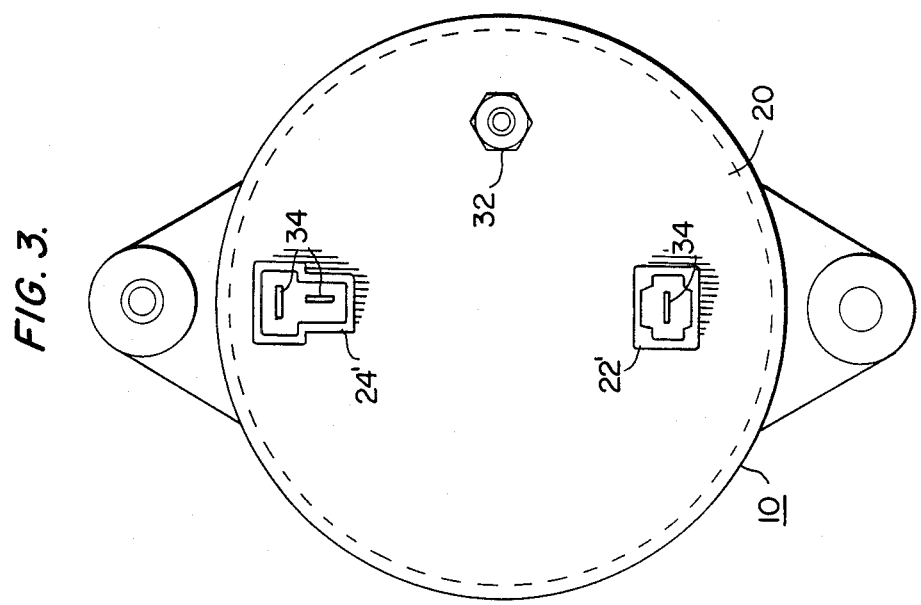

CHARGING GENERATOR HAVING WATERPROOF COVER

BACKGROUND OF THE INVENTION

This invention relates to improvements in a charging generator for a motor vehicle including a waterproof cover.

A conventional charging generator of the type referred to has comprised a bracket connected to the main body and included an externally connecting terminal unit composed of a pair of connector housings protruding from the surface of the bracket and a cup-shaped waterproof cover fixedly secured to the bracket as by bolting to cover the substantial part of the bracket. The waterproof cover has included an externally connecting connector unit composed of another pair of connector housings protruding from the inside and outside of the same and electrically connected to the connector housings on the bracket through respective leads.

In conventional charging generators such as described above, it has been required to mount the waterproof cover to the bracket after the leads have been fixed at both ends to the associated connector housings on both the waterproof cover and the bracket and therefore the main generator body. This has created difficulty in handing during assembly. On the other hand, if it is attempted to improve the workability by increasing the length of the leads, then slackened portions of the leads have occupied a volume larger than that defined by a spacing formed between the waterproof cover and the bracket, resulting in the impossibility of mounting the waterproof cover to the bracket. Also, to render the above mentioned spacing sufficiently wide has resulted in the disadvantage that the charging generator with the waterproof cover has had to be increased in axial dimension. In addition, the leads might erroneously connect the connector housings on the waterproof cover to those on the bracket.

Accordingly, it is an object of the present invention to provide a new and improved charging generator with a waterproof cover for a motor vehicle, in which the waterproof cover is capable of being easily engaged and disengaged with and from the main body thereof, and which prevents an erroneous connection while decreasing the axial dimension of the generator.

SUMMARY OF THE INVENTION

The present invention provides a charging generator for a motor vehicle comprising a main body of the charging generator which includes an externally connecting terminal unit, a waterproof cover for covering at least the externally connecting terminal unit for the charging generator, the waterproof cover including an externally connecting connector unit, and a plurality of pairs of fitting terminals fixedly inserted into the connector unit on the waterproof cover to directly connect the externally connecting terminal unit to the connector unit.

In a preferred embodiment of the present invention the externally connecting terminal unit may include a pair of connector housings of an electrically insulation material disposed in diametrically opposite relationship on the surface of the bracket to have open ends substantially flush with the surface of the bracket, the pair of connector housings including a single male terminal and a pair of male terminals, respectively all of which are identical to one another, and the waterproof cover is of an electrically insulating material in the form of a cup including an open end facing the bracket, and fixed to said bracket to cover a substantial portion. The externally connecting connector unit includes a pair of connector housings formed of the same material as said waterproof cover and integrally extending from an inner and an outer surface of the bottom of the cup-shaped waterproof cover toward and away from the bracket at positions thereof where the last mentioned connector housings are aligned with the first mentioned connector housings, respectively, when said waterproof cover is positioned on the bracket, first extensions of said connector housings directed toward the bracket being reduced in cross section enough to be fitted into the associated connector housings on the bracket, and a single fitting terminal and a pair of fitting terminals disposed in respective ones of the pair of connector housings on said waterproof cover, all said fitting terminals being identical to one another, each of said fitting terminals including one end portion formed into a male terminal located in a first extension of an associated one of the connector housings remote from the bracket and the other end portion formed into a female terminal fixedly inserted into a second extension of the associated connector housing, the arrangement being such that, when the waterproof cover is positioned on and fixed to the bracket, the connector housings on the water-proof cover are fitted into the associated connector housings on the bracket and the fitting terminals have the female terminals fitted onto the associated male terminals in the connector housings on the bracket.

BRIEF DESCRIPTION OF THE DRAWINGS

The present invention will become more readily apparent from the following detailed description taken in conjunction with the accompanying drawings in which:

FIG. 3 is a front plan view of one embodiment according to the charging generator of the present invention for a motor vehicle; and FIG. 4 is an exploded sectional view of one part of the arrangement shown in FIG. 3 with parts illustrated in elevation.

DESCRIPTION OF THE PREFERRED EMBODIMENT

Figure 1:
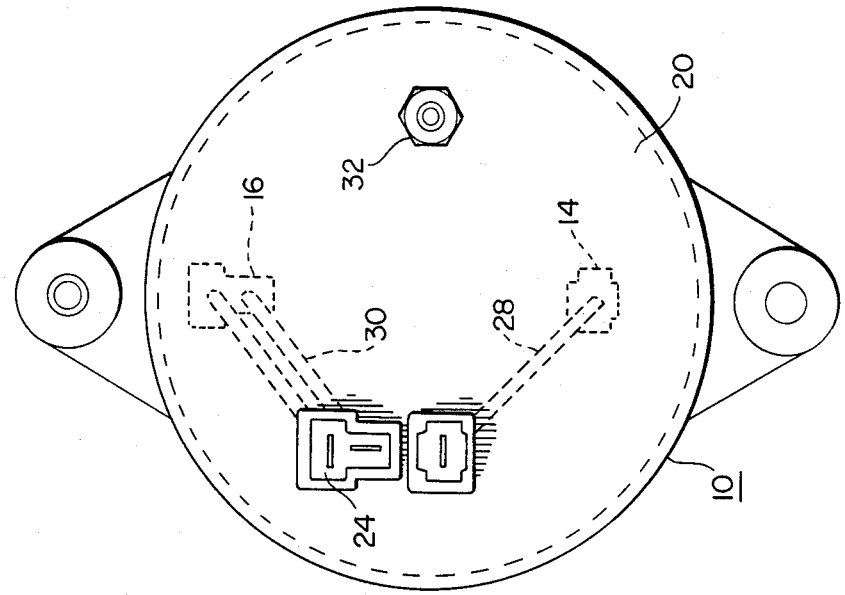
FIG. 1 is a front plan view of a conventional charging generator for a motor vehicle comprising a waterproof cover.
Figure 2:
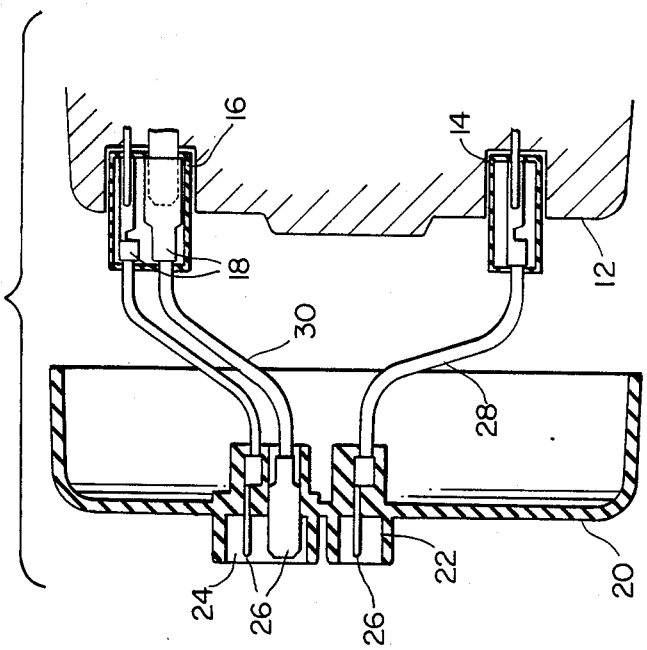
FIG. 2 is an exploded sectional view of one part of the arrangement shown in FIG. 1 with parts illustrated in elevation.

Referring now to FIGS. 1 and 2 of the drawings, there is illustrated a conventional charging generator comprising a waterproof cover. The arrangement illustrated comprises a main body of a charging generator generally designated by the reference numeral 10 and a bracket 12 fixed to one end of the main generator body 10, and an externally connecting terminal unit composed of a pair of connector housings 14 and 16 formed of an electrically insulating material. The connector housings 14 and 16 are fixedly fitted on one end portion into a pair of recess disposed in diametrically opposite relationship on the surface of the bracket 12 to be equidistant from the center thereof and include the other end portions protruding beyond the surface of the bracket 12. The connector housing 14 includes a single female metallic terminal 18 while the connector housing 16 includes a pair of female metallic terminals 18 one of which pair is turned about its longitudinal axis through 90 degrees with respect to the other. All the terminals 18 are identical to one another and disposed in the associated connector housings 14 and 16, to be fittable within limits. It will readily be understood that the terminals 18 are connected to associated portions (not shown) of the main generator body 10.

The arrangement comprises further a waterproof cover 20 of an electrically insulating material in the form of a cup including an open end facing the bracket 12 and having a size sufficient to cover the substantial portion of the bracket, and an externally connecting connector unit composed of a pair of connector housings 22 and 24 integrally protruding beyond the outer and inner surfaces of the bottom of the cup away from and toward the bracket 12 respectively at their positions where they are juxtaposed with each other to put a radius of the cup's bottom between and aligned with each other in a direction parallel to a diameter of the cup's bottom perpendicular to that radius. Thus, the connector housings 22 and 24 are formed of the same electrically insulating material as the waterproof cover 20.

The connector housings 22 and 24 have disposed therein a single terminal, and a pair of terminals, respectively, all of which are identical to one another and designated by the reference numeral 26. Each of the terminals 26 includes one end portion formed into a male terminal portion disposed in a first protrusion remote from the bracket 12 of the associated connector housing 14 or 16 to be exposed to an open end thereof and the other end portion formed into a female terminal portion fixedly inserted into a second protrusion thereof near to the bracket 12 to terminate at a female end accessible through the end surface of the second protrusion. In the connector housing 24, one of the terminals 26 is turned about its longitudinal axis through 90 degrees with respect to the other terminals 26 as the female terminal 18 disposed in the connector housing 16 on the bracket 12.

In order to fixedly secure the waterproof cover 20 to the bracket 12 at its position where the connector housing 22 and 24 on the cover 20 are respectively substantially equidistant from the connector housing 14 and 16 on the bracket 12, a lead 28 and a pair of leads 30 are first fixedly fitted at one end into the female ends of the terminals 26 disposed in the respective connector housings 22 and 24 on the cover 20 and then fixedly fitted at the other ends into the female terminals 18 disposed in the connector housings 14 and 16 on the bracket 12 as shown in FIG. 2. Thereafter, the waterproof cover 20 is disposed at its position as described above on the bracket 12 and then fixed to the bracket as by a bolt and nut combination 32. At that time the water-proof cover 20 covers the substantial portion of the bracket 12.

In conventional charging generators such as described above, it has been required to fixedly secure both ends of the leads 28 and 30 to the waterproof cover 20 and the bracket 12 or the main generator body 10, respectively, after which the waterproof cover 20 is mounted to the main generator body 10. Thus the assembling has been very difficult. If the leads 28 and 30 are increased in length to improve assembly, then slackened portions of the leads 28 and 30 have occupied a volume greater than that defined by a spacing between the waterproof cover 20 and the bracket 12, resulting in the impossibility of mounting the water-proof cover 20 to the bracket 12. Also, providing the above mentioned spacing sufficiently wide has resulted in the disadvantage that the charging generator with the waterproof cover increases in axial dimension. In addition, the leads might erroneously connect the connector housings on the waterproof cover to those on the bracket.

The present invention contemplates elimination of the disadvantages of the prior art practice as described above.

Referring now to FIGS. 3 and 4 wherein like reference numerals designate components identical or corresponding to those shown in FIGS. 1 and 2, there is illustrated one embodiment according to the charging generator of the present invention. In the arrangement illustrated, a pair of connector housings 14' and 16' are different from housings 14 and 16 shown in FIGS. 1 and 2 only in that in FIG. 4 those housings include open ends substantially flush with the surface of the bracket 12 and have disposed therein male terminals 18' but not the female terminals. Also another pair of connector housings 22' and 24' are different from those housings 22 and 24 shown in FIGS. 1 and 2 mainly in that in FIGS. 3 and 4, the connector housings 22' and 26' are located at such positions that, when the waterproof cover 20 is correctly positioned on the bracket 12', the connector housings 22 and 24' are aligned with the connector housings 14' and 16' on the bracket 12 on the longitudinal axis of the charging generator.

More specifically, the connector housings 22' and 24' integrally extend in diametrically opposite relationship from the outer and inner surfaces of the bottom of the cup-shaped waterproof cover 20 at their positions as described above to form male connector housing sections 22a and 24a externally extending from the outer surface of the cup's bottom and having open ends, and female connector housing sections 22b and 24b extending toward the bracket 12 respectively. The female connector housing sections 22b and 24b include end portions reduced in cross section enough to be respectively fitted into the associated connector housings 14' and 16' on the bracket 20.

The connector housings 22' and 24' respectively include a single fitting terminal and a pair of fitting terminals all of which are identical to one another and designated by the reference numeral 34. Each of the fitting terminals 34 includes one end portion longitudinally aligned with the one (male) end portion (in the direction toward and away from the connection housings 14' and 16', formed into a male connecting terminal, exposed to the open end of an associated one of the male connector housing sections 22a and 24a, and the other end portion fixedly inserted into an associated one of the female connector housing sections 22b and 24b and formed into a female connecting terminal exposed to the end surface of the associated female connector housing section 22b or 24b.

In other respects the connector housings 22' and 24' are identical to those shown in FIGS. 1 and 2.

When the waterproof cover 20 is correctly positioned on the bracket 12 to fit the female connector housing sections 22b and 24b into the respective connector housings 14' and 16' on the bracket 12, the fitting terminals 34 are arranged to cause their female terminals to be fitted onto the associated male terminals 18' within the connector housings 14' and 16' on the bracket 12.

From the foregoing it is seen that, in order to mount the waterproof cover 20 to the bracket 12, it is required only to position the waterproof cover 20 on the bracket 12 connected to the main generator body 10 to fit the externally connecting connector housings 22' and 24' with the fitting terminals 34 into the connector housings 14' and 16' for the main generator body 10 and then fixing the waterproof cover 20 to the bracket 12 through a bolt and nut combination 22. Thus the connection of external terminals to associated portions of the main generator body can be completed simultaneously with the fixation of the waterproof cover to the main generator body.

In summary, the present invention provides a charging generator with a waterproof cover, comprising an externally connecting connector unit disposed on the waterproof cover and fitting terminals disposed integrally with the connector unit. Therefore the waterproof cover can easily be mounted to the main generator body. Also, the fitting terminals are prevented from being erroneously connected to the male terminals for the main generator body because the associated connector housings on the waterproof cover are designed and constructed so that they are correctly fitted into the associated connector housings for the main generator body without the use of leads previously employed. Furthermore, the resulting charging generator can be formed into a compact structure. In addition, the number of components can decrease as compared with the prior art practice providing the connection with leads resulting in an economical charging generator with the waterproof cover.

While the present invention has been illustrated and described in conjunction with a single preferred embodiment thereof, it is to be understood that numerous changes and modifications may be resorted to without departing from the spirit and scope of the present invention.

What is claimed is:

1. A charging generator comprising:
   a main body of said charging generator;
   an externally connecting terminal unit having male terminal unit terminals on said main body;
   a waterproof cover for covering at least said externally connecting terminal unit;
   a bracket on said main body, said terminal unit being disposed on said bracket, said waterproof cover comprising a waterproof cup-shaped cover of an electrically unsulating material, having an open end for facing said bracket, for being positioned over and fixed to said bracket to substantially cover the same;
   an externally connecting connector unit on said waterproof cover; and
   a plurality of fitting terminals fixedly inserted into said connector unit on said cover for directly connecting said externally connecting terminal unit to said connector unit when said waterproof cover is covering said terminal unit;
   said externally connecting connector unit including a first connector housing subunit and a second connector housing subunit, respectively extending toward and away from said terminal unit when said waterproof cover is covering said terminal unit, opposite ends of said fitting terminals being respectively disposed in said first and second connector housing subunits; and
   each of said fitting terminals including a male terminal portion at the end thereof disposed in said second subunit and a female terminal portion at the end thereof disposed in said first subunit, the male terminal portions of said fitting terminals being exposed for external connection, said first subunit being insertable into said terminal unit to electrically connect the male terminal portions of said fitting terminals to said terminal unit terminals when said cover is covering said terminal unit.

2. A charging generator as in claim 1, wherein said fitting terminals are aligned in the direction toward and away from said terminal unit and are integrally formed from said female and male portions.

3. A charging generator comprising:
   a main body of said charging generator;
   a bracket on said main body;
   an externally connecting terminal unit including first and second connector housings formed of an electrically insulating material, disposed on the surface of said bracket to have open ends at the surface of said bracket, said first and second connector housings including male bracket terminals therein;
   a cup-shaped waterproof cover formed of an electrically insulating material, having an open end for facing said bracket, for being positioned over and fixed to said bracket to substantially cover the same;
   an externally connecting connector unit disposed on said waterproof cover, said externally connecting connector unit including third and fourth connector housings formed of electrically insulating material, each having first and second extensions integrally extending from inner and outer surfaces of said waterproof cover, respectively facing toward and away from said bracket at positions thereof where said third and fourth connector housings are respectively aligned with said first and second connector housings when said waterproof cover is positioned on said bracket, said first extensions of said third and fourth connector housings being shaped so as to respectively fit into said first and second connector housings of said bracket; and
   fitting terminals respectively inserted into said third and fourth connector housings on said waterproof cover, said fitting terminals including first end portions respectively formed into male cover terminals located in said second extensions of said third and fourth connector housings and second end portions respectively opposite said first end portions, formed into female cover terminals fixedly inserted into said first extensions of said third and fourth connector housings, such that, when said waterproof cover is positioned on and fixed on said bracket, said third and fourth cover terminals on said waterproof cover are respectively fitted into said first and second connector housings on said bracket and said female cover terminals are respectively fitted onto said male bracket terminals in said first and second connector housings on said bracket.

4. A charging generator for a motor vehicle, comprising:
   a main body of said charging generator;
   a bracket on said main body;
   an externally connecting terminal unit including first and second connector housings formed of an electrically insulating material, disposed in diametrically opposite relationship on the surface of said bracket to have open ends substantially flush with the surface of said bracket, said first and second connector housings respectively including a first bracket male terminal and second and third bracket male terminals, said first, second and third bracket male terminals being substantially identical to one another;

a waterproof cup-shaped cover of an electrically insulating material, having an open end for facing said bracket, for being positioned over and fixed to said bracket to substantially cover the same;

an externally connecting connector unit disposed on said waterproof cover, said externally connecting connector unit including third and fourth connector housings formed of the same material as said waterproof cover, each having first and second extensions integrally extending from an inner and an outer surface of the bottom of said cup-shaped waterproof cover respectively toward and away from said bracket at positions thereof where said third and fourth connector housings are respectively aligned with said first and second connector housings when said waterproof cover is positioned over said bracket, said first extensions of said third and fourth connector housings being shaped so as to respectively fit onto said first and second connector housings on said bracket; and a first fitting terminal and second and third fitting terminals, respectively fixedly inserted into said third and fourth connector housings on said waterproof cover, said first, second and third fitting terminals being substantially identical to one another, said first, second and third fitting terminals including first end portions respectively formed into male cover terminals located in said second extensions of said third and fourth connector housings and second end portions respectively opposite said first end portions respectively formed into first, second and third female cover terminals fixedly inserted into said first extensions of said third and fourth connector housings, such that, when said waterproof cover is positioned over and fixed on said bracket, said third and fourth connector terminals on said waterproof cover are respectively fitted into said first and second connector housings on said bracket and said first, second and third female cover terminals are respectively fitted onto said first, second and third male bracket terminals in said first and second connector housings on said bracket.

* * * * *